(No Model.)
H. C. TURNER.
ROAD CART.
No. 429,784. Patented June 10, 1890.
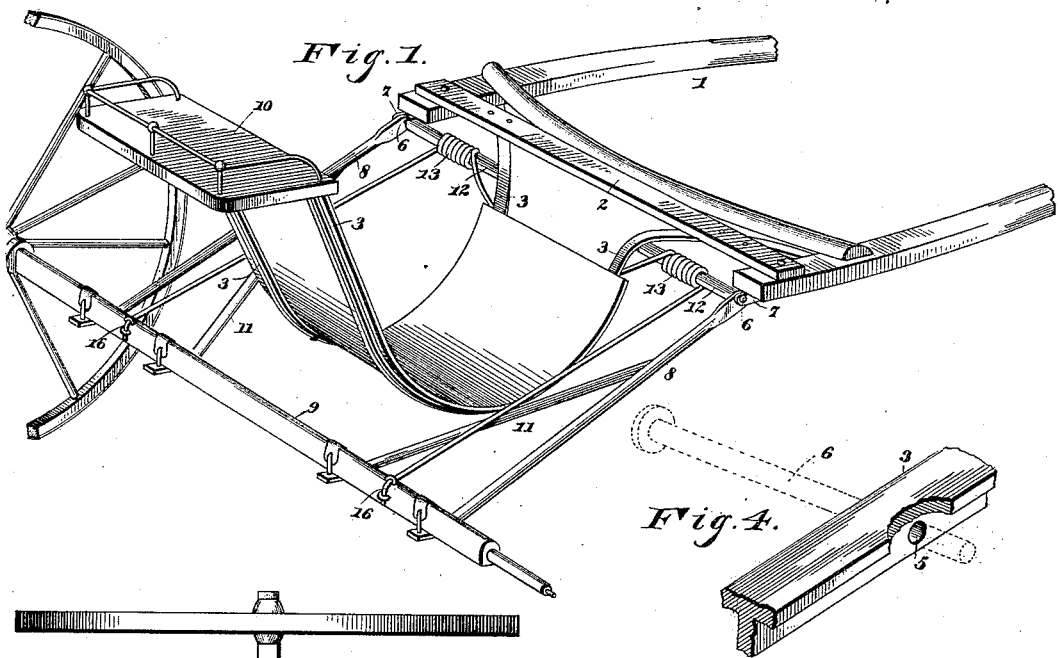
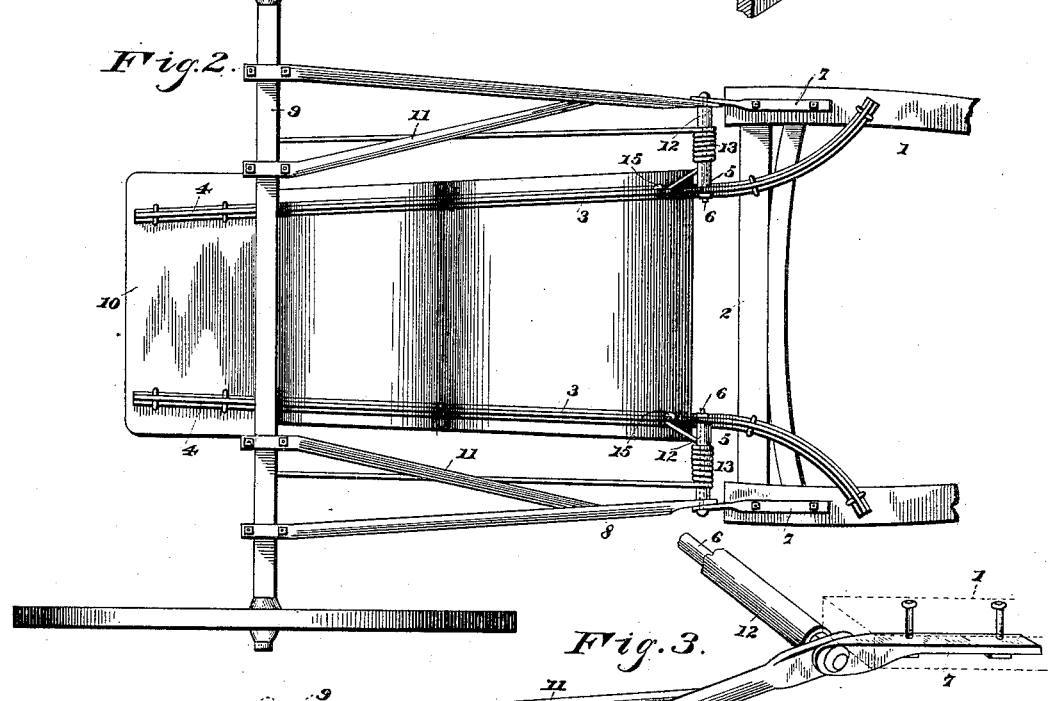
Witnesses:
Inventor
Howard C. Turner,
By his Attorneys,
C. A. Snow & Co.

UNITED STATES PATENT OFFICE.

HOWARD C. TURNER, OF MAY, MICHIGAN.

ROAD-CART.

SPECIFICATION forming part of Letters Patent No. 429,784, dated June 10, 1890.

Application filed April 12, 1890. Serial No. 347,697. (No model.)

*To all whom it may concern:*

Be it known that I, HOWARD C. TURNER, a citizen of the United States, residing at May, in the county of Tuscola and State of Michigan, have invented a new and useful Road-Cart, of which the following is a specification.

The invention relates to improvements in two-wheeled vehicles.

The object of the present invention is to simplify and improve the construction of two-wheeled vehicles and enable the wheels to have a vertical motion independent of the seat and seat-frame, and thereby prevent the jolts occasioned by obstructions and inequalities in a road being communicated to the seat-frame and the occupant of the vehicle.

The invention consists in the construction and novel combination and arrangement of parts hereinafter fully described, illustrated in the accompanying drawings, and pointed out in the claims hereto appended.

In the drawings, Figure 1 is a perspective view of a two-wheeled vehicle constructed in accordance with this invention. Fig. 2 is a reverse plan view. Fig. 3 is a detail perspective view illustrating the manner of hinging the thill to the axle. Fig. 4 is a detail perspective view of a portion of one of the side bars, the bolt being illustrated in dotted lines.

Referring to the accompanying drawings, 1 designates a pair of thills of the ordinary construction, having secured to their rear ends the cross-bar 2, to the lower face of which are secured the side bars 3 of the seat-frame 4. The side bars 3 are constructed of T-shaped or flanged metal, and they have their front ends divergently curved and bolted or similarly secured to the cross-bar 2 and the thills 1, and they are provided with oppositely-disposed openings 5, through which pass bolts 6, that form the pintles of the bars 7 and 8, that are hinged together and similarly connect the axle 9 with the thills. The seat 10 and seat-frame 4 are rigidly secured to the thills, while the axle is hinged to the thills and is capable of a vertical movement that is independent of the motion of the seat, and when the wheels of the vehicle strike a rock, log, or other obstruction in the road they will rise and pass over the obstruction without jolting the occupant of the vehicle, and the same is the case where the wheels encounter any ruts or depressions in the road. The hinged bars or rods 7 and 8 are of unequal lengths, the shorter one 7 being secured to the lower face of a thill, and the longer rod or bar 8 extending rearward and being clipped to the axle. The longer rod or bar 8 is supported by a brace 11, which has one end secured to the rod 8 slightly in the rear of the joint, and it may be formed integral with the rod 8, and it has its rear end clipped to the axle similarly to the rod 8. The bolt 6 is provided with a sleeve 12, that is interposed between the adjacent side bar and the hinged bars 7 and 8 at one side of the vehicle, and coiled upon the sleeve 12 is a spring 13, that has one end 14 provided with a hook 15 to engage the lower flange of the adjacent side bar 3, and the other end 16 is longer and extends rearward and is secured to the axle. The spring 13 acts as a main spring and preserves the axle in proper relation to the seat-frame, and when the wheels strike an obstruction they will rise against the action of the spring, and when the wheels enter a rut or depression the reverse operation takes place. By this construction the wheels are capable of vertical motion independent of the seat-frame and the vehicle is enabled to pass over rough surfaces without jolting the occupant.

From the foregoing description and the accompanying drawings the construction, operation, and advantages of the invention will readily be understood.

What I claim is—

1. In a two-wheeled vehicle, the combination of the thill, the seat-frame rigidly connected therewith, the axle hinged to the thills and capable of vertical motion independent of the seat-frame, and the spring to maintain the axle in proper position relative to the seat-frame, substantially as described.

2. In a two-wheeled vehicle, the combination of the thills, the seat-frame having its side bars rigidly secured to the thills, the bolts projecting laterally from the side bars, the bars 7 and 8, hinged by the bolts, the bars 7 being secured to the thills, the axle secured to the end of the bars 8, and the springs 13, coiled around the bolts and having one end engaging the adjacent side bar of the seat-frame and the other end engaging the axle, substantially as described.

3. In a two-wheeled vehicle, the combination of the thills, the axle, the seat-frame having its side bars rigidly secured to the thills, the bars 7, secured to the thills, the long bars 8, clipped to the axle, the bolts 6, projecting laterally from the side bars and hinging the bars 7 and 8 together, the sleeves 12, interposed between the side bars of the frame and the hinged bars 7 and 8, and the springs coiled upon the sleeves and having one end engaging the adjacent side bar and the other end engaging the axle, substantially as described.

In testimony that I claim the foregoing as my own I have hereto affixed my signature in presence of two witnesses.

HOWARD C. TURNER.

Witnesses:
  A. B. MARKHAM,
  J. J. CRETSINGER.